United States Patent [19]

Lussier et al.

[11] 3,994,800

[45] Nov. 30, 1976

[54] CATALYTIC CRACKING WITH CATALYST OF IMPROVED Y ZEOLITE

[75] Inventors: Roger Jean Lussier, Ellicott City; Edwin Wolf Albers, Annapolis; John Storey Magee, Jr., Cooksville, all of Md.

[73] Assignee: W. R. Grace & Co., New York, N.Y.

[22] Filed: Feb. 19, 1975

[21] Appl. No.: 551,219

[52] U.S. Cl. .............................. 208/120; 252/455 Z
[51] Int. Cl.² ................... C10G 11/04; B01J 29/12; B01J 8/24
[58] Field of Search .................................... 208/120

[56] References Cited
UNITED STATES PATENTS

| 3,293,192 | 12/1966 | Maher et al. ...................... 252/430 |
| 3,324,047 | 6/1967 | Hansford ........................ 252/455 Z |
| 3,402,996 | 9/1968 | Maher et al. ...................... 423/328 |
| 3,591,488 | 7/1971 | Eberly et al. ...................... 208/111 |
| 3,644,200 | 2/1972 | Young ................................ 208/120 |
| 3,781,199 | 12/1973 | Ward ................................... 208/89 |
| 3,783,123 | 1/1974 | Young ................................. 208/111 |
| 3,804,747 | 4/1974 | Kimberlin et al. ................... 208/120 |
| 3,835,030 | 9/1974 | Mattox et al. ....................... 208/120 |

*Primary Examiner*—Delbert E. Gantz
*Assistant Examiner*—G. E. Schmitkons
*Attorney, Agent, or Firm*—Kenneth E. Prince; Joseph P. Nigon

[57] ABSTRACT

A process for cracking hydrocarbon feedstocks by contacting such stocks under cracking conditions with a composite catalyst comprising an improved hydrogen exchanged Y-type zeolite component and an amorphous inorganic matrix component. The use of this catalyst yields cracked naphthas of increased olefinic content for the production of lead-free high octane gasoline. Further improvement in the levels of $C_3$ and $C_4$ olefins can be realized by incorporating a portion of calcined rare earth exchanged Y-type zeolite into the composite catalyst.

5 Claims, No Drawings

CATALYTIC CRACKING WITH CATALYST OF IMPROVED Y ZEOLITE

BACKGROUND OF THE INVENTION

The present invention relates to hydrocarbon cracking catalysts, and more specifically to improved zeolite cracking catalyst compositions which are capable of producing a high yield of aromatic and olefinic gasoline fractions of enhanced octane rating.

It is generally known that hydrocarbon cracking catalysts which are promoted with stabilized zeolites, particularly ion exchanged synthetic faujasite (X and Y-type), are capable of producing high yields of gasoline fractions from petroleum feedstocks such as gas oil. These cracked gasoline fractions are subsequently combined with octane enhancing additives such as tetraethyl lead to produce high octane motor fuel.

Recent emphasis on air pollution control has dictated a need for removing metal-type octane enhancing additives from commercial gasolines. To produce nonleaded gasoline of sufficient octane rating for use in modern automobile engines it is generally necessary for the refiner to use a blend of petroleum gasoline fractions which are of inherently high octane rating. Highly aromatic and olefinic gasoline fractions are of particular use to the refiner. Unfortunately, however, gasoline fractions produced by the cat-cracking of gas-oil using crystalline zeolite type cracking catalysts are of relatively low aromatic and olefinic content. Accordingly, relatively expensive subsequent catalytic treatment is generally required to increase the aromatic and olefinic content, and hence the octane rating of cat-crack gasolines, to thereby avoid the addition of metal type octane enhancing additives.

We have found that catalytically cracked gasoline fractions having increased aromatic and olefinic content can be produced by contacting hydrocarbon feedstocks with an improved exchanged zeolite/amorphous matrix type cracking catalyst.

Broadly, our invention contemplates a zeolite cracking catalyst which comprises a Y-type zeolite from which the sodium content has been removed in a novel manner and replaced with hydrogen ions. Calcination at 1000° F. prior to removal of all $Na_2O$ enables the H-Y sieve to yield a higher octane gasoline product.

More specifically, we have made the finding that a Y-type zeolite having a silica to alumina ratio in excess of about 3.0 which has been ion exchanged with hydrogen ions in a novel manner will catalyze the cracking or petroluem to produce gasoline fractions of unusually high aromatic and olefin content. In addition a catalyst promoted with this sieve produces high yields of $C_4$ olefins without greatly changing gasoline selectivity or coke and hydrogen yields. The production of high level yields of $C_3$ and $C_4$ olefins can be enhanced even more by the addition of promotional amounts of calcined rare earth exchanged zeolite (CREY) to the catalyst composite. The primary purpose of CREY addition is, however, to enhance activity.

To produce the hydrogen exchanged Y-type zeolite, i.e., H-Y contemplated herein, the following procedure is used:

1. A sodium type Y zeolite is exchanged with an acidified ammonium salt solution having a pH of approximately 3.0 to 3.5 until the zeolite contains less than 4% and preferably about 3 weight percent $Na_2O$.
2. The ammonium exchanged zeolite is then heated (calcined) at about 1000° to 1500° F. for 0.1 to 12 hours.
3. The calcined zeolite is again exchanged with ammonium ions to lower the $Na_2O$ content of the zeolite to below 1% by weight,
4. The exchanged zeolite is calcined at 1000° to 1500° F. for 0.1 to 12 hours, cooled & recovered.

The particularly significant point in our novel method of preparation is the first exchange step with an *acidified* ammonium salt solution. Prior art preparations of hydrogen exchanged zeolite involve the use of ammonium salt solution having a pH in the range of 4.0 to 7.0.

The first step in our process is the selection of a suitable zeolite. Our product can be prepared from certain natural and synthetic zeolites, such as the natural and synthetic faujasites. A particularly suitable raw material is synthetic Y-type faujasite in the sodium form having the formula:

$$0.9 \pm 0.2\ Na_2O:Al_2O_3:WSiO_2:XH_2O$$

wherein W has a value of greater than 3 and up about 6 and X may have a value as high as 9. This material is disclosed in U.S. Pat. No. 3,130,007 to Breck.

The next step of our process is the exchange of the above zeolite with an acidified ammonium salt, amine salt or other salt which on calcination decomposes and leaves an appreciable portion of the zeolite in the hydrogen form. The acidification can be accomplished by adding a mineral acid to the exchange solution until a pH in the range of 3.0 to 3.5 is reached. Examples of suitable compounds for the exchange procedure include ammonium chloride, ammonium sulfate, tetraethyl ammonium chloride, tetraethyl ammonium sulfate, etc. Ammonium salts because of their ready availability and low cost, are the preferred reagents of this step of the reaction. The preferred combination of ammonium compound and acid is ammonium sulfate and sulfuric acid due to the ease with which sulfate ions can be washed from the zeolite. Since acids themselves can exchange hydrogen ions into the zeolite structure a sulfuric acid solution alone having a pH of from 3.0 to 3.5 is also contemplated as the exchange medium for this step. It will be understood that to preclude the formation of unwanted side products the ammonium compound and acid will have the same cation (ammonium chloride-hydrochloric acid).

This first exchange is carried out rapidly with an excess of salt solution. The salt may be present in excess of about 5 to 600%, preferably about 20 to 300%. The exchange is generally completed in a period of about 0.1 to 24 hours. This preliminary exchange reduces the alkali metal content of the zeolite. Chemical analysis of the product at this stage shows that the product contains 1.5 to 4% by weight of alkali metal. It is preferred that the $Na_2O$ content of the product at this stage be no more than 1.5 to 2.9 weight percent alkali metal oxide.

After the preliminary exchange is completed, the zeolite is filtered, washed and dried. It is desirable that the zeolite be washed sulfate free at this stage of the process. The composite is then calcined at a temperature in the range of 1000°–1500° F. The calcination is preferably carried out for a period of 0.1 to 12 hours at a temperature of from 1200°–1500° F. The calcination seems to cause an internal rearrangement or transfer so that the remaining alkali metal ions are lifted from their buried sites and can now be easily ion exchanged in the next step by a mild treatment with a salt solution.

In the next step of the process, the zeolite is treated with a solution of ammonium salt or amine salt, etc. This exchange should be carried out for a period of 0.1 to 24 hours, conveniently for a period of 3 hours. It is desirable that this exchange be conducted at a temperature of 25° to 150° C. At the end of this time the material is again filtered, washed thoroughly to remove all traces of sulfate and stabilized by calcination at high temperatures. It is preferable that the alkali metal oxide content of the product be no more than 0.5 weight percent prior to the final stabilization step.

The product should not be dried and then stored for long periods of time prior to the final stabilization. It can be dried immediately prior to stabilization in a preheat zone of the furnace. However, if the material is to be held for any appreciable period of time, it should be held as a wet filter cake (60% total volatiles) and can be held in this condition for a period of more than 48 hours without damage. The final stabilization is achieved by heating the material to a temperature of 1100°–1500° F. for a period of 0.1 to 12 hours.

The catalysts contemplated in the present invention may comprise either essentially 100% H-Y or the H-Y may be admixed with an inorganic oxide component. Where it is desired to obtain a catalyst in particle form, the precursor synthetic sodium Y zeolite ingredient may be in the form of a formed fluidizable or pelleted particle. This fluidizable or pelleted particle is subjected to the above exchange and calcination procedures to obtain a catalyst product which is essentially all H-Y.

When it is desired to obtain a catalyst which contains H-Y admixed with an inorganic oxide matrix, the H-Y in finely divided form is blended with a suitable inorganic oxide matrix component. Suitable matrix components are generally described in the prior art, and may be selected from inorganic hydrogels such as silica, alumina and silica-alumina hydrogel. In general, these hydrogel components are essentially amorphous and are readily blended with the highly crystalline H-Y component. It is also contemplated that matrix components such as clay and combinations of clay with amorphous inorganic hydrogels may be combined with the presently contemplated H-Y catalyst component.

As indicated above, the catalysts contemplated herein may be obtained in fluid form wherein finely divided spray dried microspheres having a particle size range of from about 10 to 105 microns are obtained using conventional catalyst preparation techniques. It is also contemplated that catalysts suitable for moving or fix bed operation wherein the catalyst particle size ranging from about 5 to 40 mesh may also be obtained using standard catalyst preparation procedures.

The present catalysts are used in the cat-cracking of heavy petroleum feedstocks. Preferably the catalysts are used in a conventional manner wherein the petroleum feedstock such as gas oil is contacted with a bed of the catalyst at a temperature of from about 800° to 1000° F. The contact time of the petroleum feedstock with the catalyst will depend on the specific catalytic process employed; however, it is found that contact times as low as 5 seconds up to 300 seconds may be advantageously employed using the highly active catalyst of the present invention.

When the present catalyst is used in combination with a typical semi-synthetic matrix, i.e., a matrix comprising silica-alumina hydrogen and clay, wherein the H-Y component is present in amounts ranging from about 5 to 50% by weight, the catalyst will exhibit a microactivity on the order of from about 45 to 80 when tested under standard conditions. As was mentioned previously, H-Y can also be combined with portions of calcined rare earth exchanged Y-type zeolite designated CREY the preparation of which is disclosed in U.S. Pat. No. 3,402,996, example VI in particular. When the zeolite component contains both H-Y and CREY the preferred ranges are; 5.0 to 50 weight percent H-Y, 1.0 to 10 weight percent CREY and 40 to 90 weight percent inorganic matrix. The addition of small amounts of CREY further enhances the yields of $C_3$ and $C_4$ olefins in the product stream. The combination H-Y/CREY promoted catalyst will exhibit a microactivity on the order of from about 50 to 80 when tested under standard conditions. The product distribution obtained using the present catalysts reveals that high yields of gasoline fractions ($C_4$ through $C_9$) are obtained. These gasoline fractions possess an extraordinarily high aromatic content which is readily measured using standard NMR techniques. It is also found that the catalysts produce exceptionally high yields of $C_4$ olefins and branch chain $C_4$ isomers. The present catalysts produce a cracked product which contains only small quantities of undesirable dry gas (hydrogen, $C_1$ and $C_2$) products and only small amounts of coke.

Having set forth the basic aspects of the present invention, the following examples are given to illustrate specific embodiments thereof.

EXAMPLE I

Preparation of H-Y 300 grams (dry basis) of a commercially available sodium Y-type zeolite (with a silica/alumina ratio of 5.4) were slurried in 2 liters of de-ionized water at 150° F. for one half hour and then filtered. The filter cake was washed with 2 liters of 150° F. de-ionized water. The zeolite was then reslurried in a solution containing 1200 milliliters of de-ionized water, 150 grams of ammonium sulfate and 11 milliliters of concentrated sulfuric acid, and boiled under atmospheric pressure for 1 hour.

The once-exchanged zeolite was filtered then washed sulfate free with 1200 milliliters of 150° F. de-ionized water. This step was repeated until the filtrate is sulfate free. The zeolite was calcined for 3 hours at 1430° F. and after cooling reslurried in a solution of 300 grams of ammonium sulfate in 3 liters of de-ionized water. This exchange was carried out at 212° F. for 1 hour. The zeolite is then filtered and washed with 150° F. de-ionized water until the filtrate was sulfate free. The final step was a calcination and stabilization for 3 hours at 1200° F.

EXAMPLE II

Catalyst preparation H-Y plus a matrix 6 grams of H-Y as prepared above were slurried in a Waring blender with 200 milliliters of de-ionized water for 3 minutes. In a separate blender 165.5 grams (24.0 grams dry basis) of a semi-synthetic matrix (30% clay, 70% amorphous silica alumina) is slurried in 150 milliliters of de-ionized water for one half minute. The zeolite slurry is then added to the matrix slurry and the mixture is in turn blended for 2 minutes. The catalyst is then filtered and oven dried at 240° F. overnight. The dried catalyst was then ground up in an impact mill, pilled, steam deactivated and then tested in a microactivity apparatus.

The microactivity syncrude was analyzed by gas chromatography for olefins in the $C_6$ fraction. The results are compared below in Table I with a CREY promoted catalyst and a commercially available low rare earth exchanged Y-type cracking catalyst.

TABLE 1

| Sample No. | Promoter | %Promoter | Vol. %Conv.[1] | % olefins[2] in $C_6$ product |
|---|---|---|---|---|
| 1 | H-Y | 20 | 60 | 24.4 |
| 2 | CREY | 2.5 | 57 | 19.5 |
| 3 | RE-Y | 10 | 64 | 15.7 |

[1]Measured at 920° F., 16 weight hourly space velocity and 5.8 catalyst/oil ratio after steam deactivation.
[2]Percentage of selected olefins in the $C_6$ product.

These results clearly indicate that this promoter gives a catalyst which yields much higher levels of olefins in the $C_6$ product fraction.

EXAMPLE III

A catalyst was prepared according to Example II containing our novel exchanged promoter (H-Y) and compared with catalysts containing conventionally exchanged hydrogen Y-type zeolite in one case and a calcined rare earth exchanged zeolite (CREY) in the other.

Table 2

| Promoter | | H-Y | Standard Hex.Y | CREY |
|---|---|---|---|---|
| Wt. % promoter | | 22.0 | 22.0 | 5.0 |
| Conversion[1] | : V% | 68.0 | 62.0 | 66.5 |
| $H_2$ | : V% | 0.03 | 0.02 | 0.03 |
| $C_3$ | : V% | 7.0 | 5.4 | 6.3 |
| $C_4$ | : V% | 6.2 | 4.2 | 4.3 |
| RON+O | : | 91.4 | 86.8 | 88.9 |
| MON+O | : | 78.6 | 75.4 | 77.4 |
| Br. no. | : | 72.0 | 65.0 | 57.0 |
| Coke | : W%FF | 3.3 | 3.0 | 3.6 |

[1]Pilot unit conditions: 20 weight hourly space velocity, catalysts to oil ratio of 4, 920° F. after steam deactivation.

These data clearly indicate that our H-Y gives: (a) higher yields of $C_3$ and $C_4$ olefins, (b) higher RON+O and MON+O, and (c) no higher coke or hydrogen yield than conventional promoters.

EXAMPLE IV

Catalysts were prepared according to Examples 1 and 2 containing combinations of H-Y alone, H-Y + CREY and CREY alone to compare the effects of adding small amounts of CREY to the catalyst of the present invention. Comparative pilot unit data is shown in Table 3.

Table 3

| Promoter | US + CREY | US | US | CREY |
|---|---|---|---|---|
| Wt.% (Total Basis) | 22 + 3 | 22 | 30 | 15 |

Table 3-continued

| Pilot Unit Data | 40 weight hourly space velocity, catalyst to oil ratio 4, 920° F., WTGO Feed after S-13.5 steam deactivation. | | | |
|---|---|---|---|---|
| Conversion | 68.0 | 56.0 | 59.0 | 71.5 |
| Total $C_3$ | 8.8 | 8.0 | 8.6 | 7.8 |
| $C_3^=$ | 8.0 | 7.3 | 7.7 | 6.1 |
| Total $C_4$ | 12.0 | 11.5 | 12.5 | 11.5 |
| $C_4^=$ | 7.0 | 7.4 | 7.6 | 4.9 |
| RON + O | 91.5 | 91.6 | 91.5 | 87.8 |
| MON + O | 78.0 | 77.7 | 77.8 | 77.0 |

These data show the promotional effect on activity of adding small amounts of conventional CREY zeolite materials to the catalyst of the present invention. Note that there is no significant change in the octane enhancement caused by the addition of a small amount of CREY.

What is claimed is:
1. A method of cracking a hydrocarbon feedstock to obtain lower boiling hydrocarbons of increased olefinic content which comprises subjecting said feedstock to cracking conditions in the presence of a catalyst comprising a crystalline aluminosilicate zeolite component dispersed in an amorphous inorganic matrix material, said catalyst being prepared by a process consisting of the following steps:
   a. successively ion-exchanging a crystalline zeolite of the Y-type with a solution of at least one salt selected from the group consisting of ammonium and complex amine salts acidified to a pH of 3.0 to 4.0 with a mineral acid until the alkali metal content is reduced to about 3 weight percent,
   b. calcining said exchanged zeolite at a temperature of 1000° to 1500° F. for a period of 0.1 to 12 hours,
   c. cooling the zeolite and successively base-exchanging it with a solution of at least one salt selected from the group consisting of ammonium and complex amine salts until the alkali metal content is reduced to less than 1 percent by weight,
   d. calcining at a temperature of about 1000° to 1500° F. for a period of 0.1 to 12 hours,
   e. cooling and recovering the exchanged zeolite,
   f. combining said zeolite with an amorphous inorganic matrix material,
   g. forming the composite into catalyst particles.
2. A process according to claim 1 wherein in step (f) 5 to 50 weight percent zeolite is combined with from 50 to 95 weight percent amorphous inorganic matrix material.
3. A process according to claim 1 wherein said amorphous inorganic matrix material is a semi-synthetic material consisting essentially of clay and amorphous silica-alumina.
4. A process according to claim 1 wherein said acidified solution of step (a) consists essentially of an aqueous solution of ammonium sulfate and sulfuric acid having a pH of from about 3.0 to 3.5.
5. A process according to claim 1 wherein in step (f) from 1 to 10 weight percent of a calcined rare earth exchanged Y-type zeolite is combined with said hydrogen exchanged zeolite and said matrix material.

* * * * *